US011204418B2

(12) United States Patent
Park

(10) Patent No.: US 11,204,418 B2
(45) Date of Patent: Dec. 21, 2021

(54) SYSTEM FOR SURVIVAL DETECTION IN DANGEROUS SPACE

(71) Applicant: Kyoung Jin Park, Anyang-si (KR)

(72) Inventor: Kyoung Jin Park, Anyang-si (KR)

( * ) Notice: Subject to any disclaimer, the term of this patent is extended or adjusted under 35 U.S.C. 154(b) by 312 days.

(21) Appl. No.: 16/477,267

(22) PCT Filed: Feb. 14, 2018

(86) PCT No.: PCT/KR2018/001917
§ 371 (c)(1),
(2) Date: Jul. 11, 2019

(87) PCT Pub. No.: WO2018/151519
PCT Pub. Date: Aug. 23, 2018

(65) Prior Publication Data
US 2021/0278525 A1   Sep. 9, 2021

(30) Foreign Application Priority Data
Feb. 17, 2017   (KR) .................. 10-2017-0021427

(51) Int. Cl.
*G01S 13/88*     (2006.01)
*G08B 21/02*     (2006.01)
*G08B 25/14*     (2006.01)
*G08B 27/00*     (2006.01)

(52) U.S. Cl.
CPC ........ *G01S 13/886* (2013.01); *G08B 21/0211* (2013.01); *G08B 21/0277* (2013.01); *G08B 25/14* (2013.01); *G08B 27/001* (2013.01)

(58) Field of Classification Search
CPC ..................................................... G01S 13/886
See application file for complete search history.

(56) References Cited

U.S. PATENT DOCUMENTS 6,211,790 B1 *  4/2001  Radomsky ......... G08B 21/0247
                                                    340/573.4
2009/0227882 A1 *  9/2009  Foo ..................... G01S 13/0209
                                                    600/508

FOREIGN PATENT DOCUMENTS

JP      2009-528859 A      8/2009
KR      10-141898 B1       7/2014

* cited by examiner

*Primary Examiner* — Travis R Hunnings
(74) *Attorney, Agent, or Firm* — Korus Patent, LLC; Seong Il Jeong

(57) ABSTRACT

The present invention relates to a system for survival detection in a dangerous space. According to the present invention, the survival and location of a subject located in a dangerous space can be effectively detected from the outside according to ultra-wideband (UWB) radar.

3 Claims, 4 Drawing Sheets

SYSTEM FOR SURVIVAL DETECTION IN DANGEROUS SPACE

TECHNICAL FIELD

The present invention relates to a system for survival detection in a dangerous space, and more specifically to a system for survival detection in a dangerous space, which can effectively detect the survival and location of a subject located in a dangerous space from the outside by using ultra-wideband (UWB) radar.

BACKGROUND ART

There are cases where workers are dispatched to sealed dangerous spaces, such as a tunnel, a gas tank, a sewer, etc. and perform various types of work.

Since such an area is generally isolated or sealed from the outside, a problem arises in that when a worker falls into unconsciousness while working in the area, it is significantly difficult to recognize the situation from the outside, and thus appropriate measures cannot be taken.

Furthermore, even when a fire occurs in the area, it is significantly difficult to determine whether a person is present in the area from the outside, and thus a problem arises in that appropriate measures, such as the dispatch of a firefighting team into the area, cannot be taken.

DISCLOSURE

Technical Problem

The present invention has been conceived to overcome the above-described problems, and an object of the present invention is to provide a system for survival detection in a dangerous space, which can effectively detect the survival and location of a subject located in a dangerous space from the outside by using ultra-wideband (UWB) radar.

Technical Solution

The above object is achieved by a system for survival detection in a dangerous space, the system including: a radar unit which is disposed in a dangerous space which is a space where a subject is located, which is provided as radar using ultra-wideband (UWB) frequencies, and which detects a biometric signal of the subject; a terminal unit which is disposed outside the dangerous space, which displays the biometric signal, transferred from the radar unit, on a screen, and which generates an emergency signal when it is determined based on the biometric signal that the subject is in a risky state; and a lamp unit which is disposed in the dangerous space, and which is lit when receiving the emergency signal.

Furthermore, the present invention may further include a control unit which dispatches emergency medical personnel to the dangerous space when receiving the emergency signal from the terminal unit.

Furthermore, the radar unit may include: a transmission unit which transmits first radio waves to the subject, a reception unit which receives second radio waves reflected after the first radio waves have been transmitted to the subject, a computation unit which generates the biometric signal of the subject based on the first radio waves and the second radio waves, a communication unit which transfers the biometric signal to the terminal unit, and a battery unit which supplies power to the transmission unit, the reception unit, the computation unit, and the communication unit.

Furthermore, the communication unit may be provided to be able to communicate with the terminal unit by using any one or more of a Bluetooth method, a wireless LAN (WLAN) method, a wideband code division multiple access (WCDMA) method, and a long team evolution (LTE) method.

Advantageous Effects

According to the present invention, the survival and location of a subject located in a dangerous space can be effectively detected from the outside according to the ultra-wideband (UWB) radar.

MODE FOR INVENTION

A system for survival detection in a dangerous space according to one embodiment of the present invention will be described in detail below with reference to the accompanying drawings.

Figure 1:
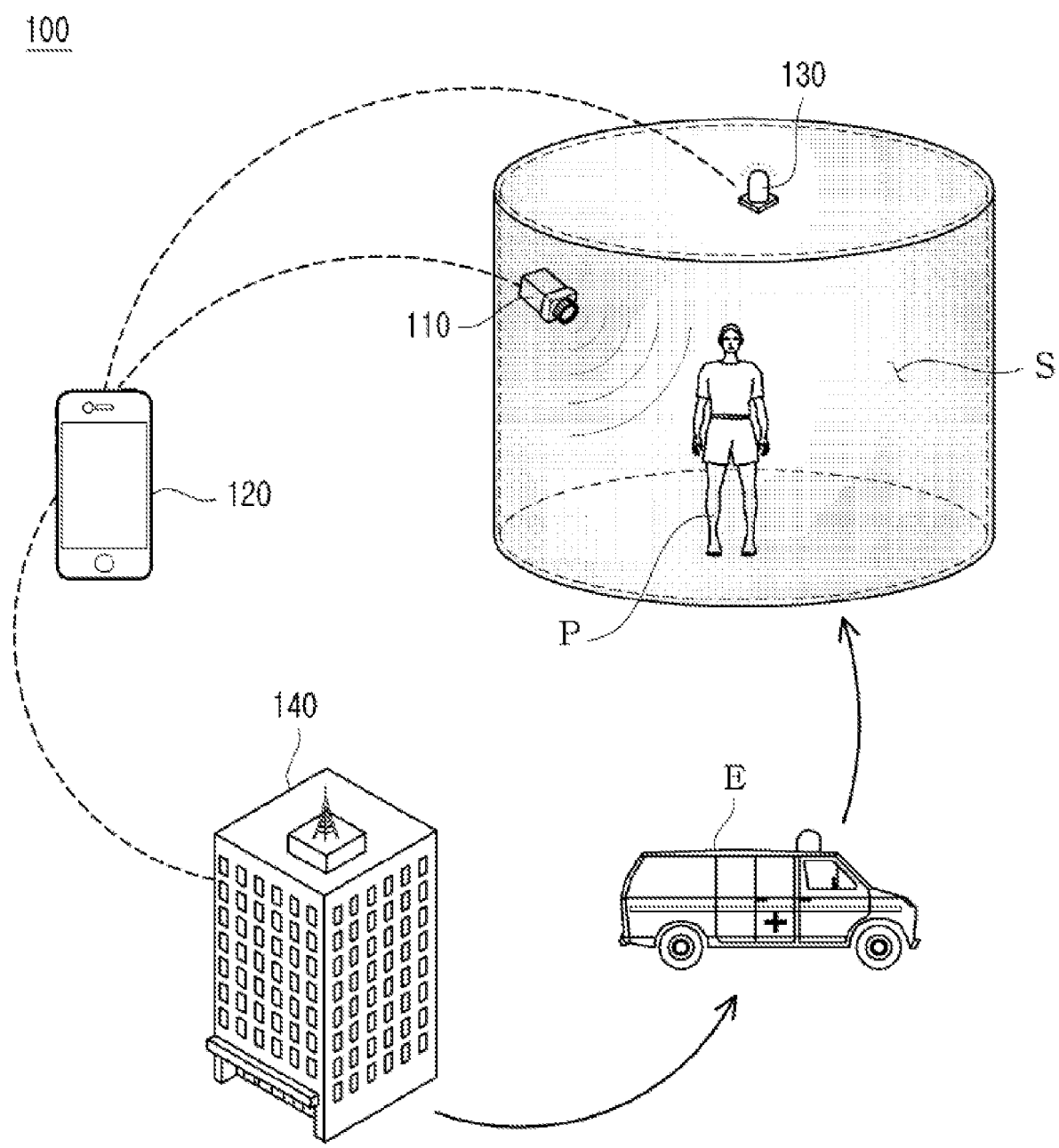
FIG. 1 is a view showing an overall system for survival detection in a dangerous space according to one embodiment of the present invention.
Figure 2:
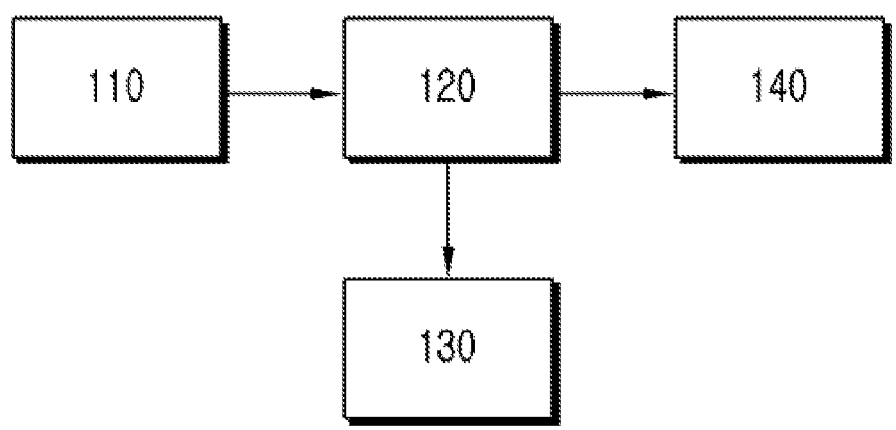
FIG. 2 is a view showing electrical connections between the components of the system for survival detection in a dangerous space according to the embodiment of the present invention.
Figure 3:
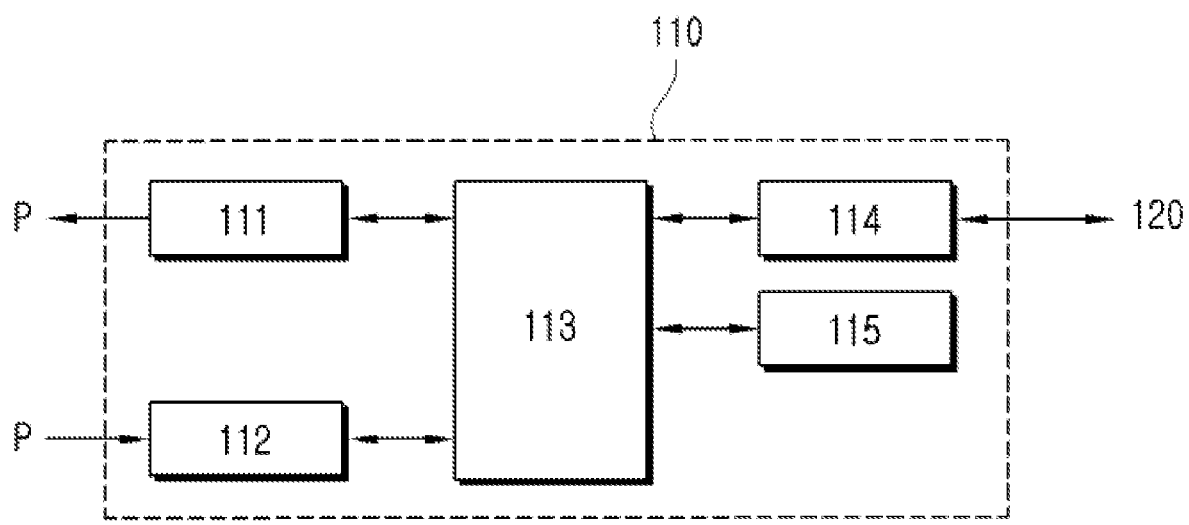
FIG. 3 is a view showing the transfer of information in the radar unit of the system for survival detection in a dangerous space according to the embodiment of the present invention.
Figure 4:
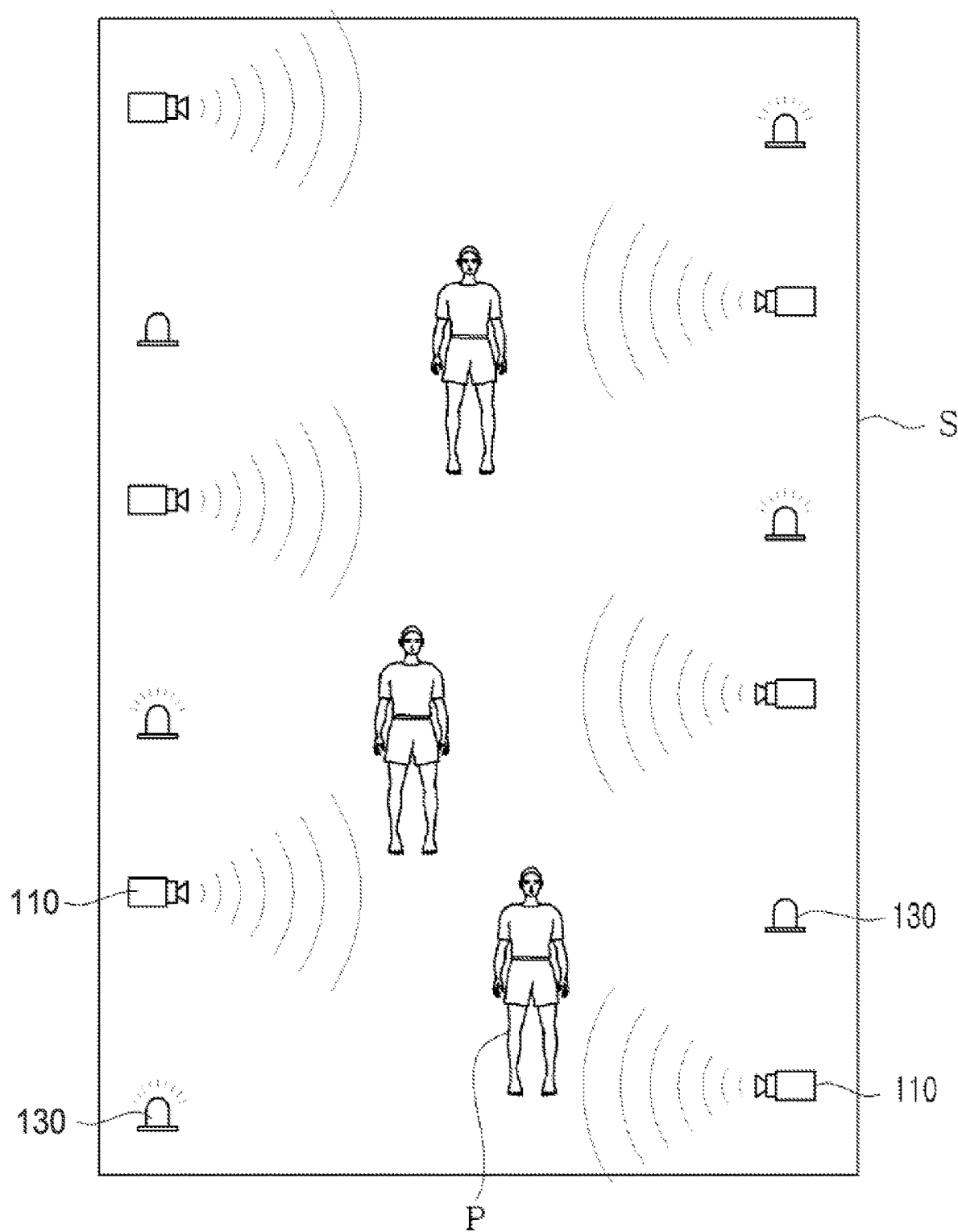
FIG. 4 is a view showing a case where pluralities of radar units and lamp units are disposed in a dangerous space of a system for survival detection in a dangerous space according to one embodiment of the present invention.

FIG. 1 is a view showing the overall system for survival detection in a dangerous space according to the embodiment of the present invention, FIG. 2 is a view showing electrical connections between the components of the system for survival detection in a dangerous space according to the embodiment of the present invention, FIG. 3 is a view showing the transfer of information in the radar unit of the system for survival detection in a dangerous space according to the embodiment of the present invention, and FIG. 4 is a view showing a case where pluralities of radar units and lamp units are disposed in a dangerous space of a system for survival detection in a dangerous space according to one embodiment of the present invention.

As shown in FIGS. 1 to 4, the system 100 for survival detection in a dangerous space according to the embodiment of the present invention includes a radar unit 110, a terminal unit 120, a lamp unit 130, and a control unit 140.

The radar unit 110 is provided as radar using ultra-wideband (UWB) frequencies, detects a biometric signal of a subject P, and is disposed in a dangerous space S which is a space where the subject P is located. It is preferable that the radar unit 110 be placed on an edge-side ceiling of the dangerous space S and disposed toward the center of the dangerous space S so that detection efficiency can be improved.

In this case, the dangerous space S refers to a work space such as a tunnel, a gas tank, a sewer, or the like, or a lonely space such as the inside of an elevator, an emergency staircase, a corridor, or the like.

In this case, the ultra-wideband frequencies refer to the frequency band of 3.1 to 10.6 GHz. When the ultra-wideband frequencies are used, short pulses can be used, and thus an advantage arises in that an object to be detected can be accurately detected.

When the ultra-wideband frequencies are applied to radar, the radar may use a considerably wide frequency band of several or more GHz in a baseband without using a radio frequency (RF) carrier, and thus an advantage arises in that the frequencies may be shared and used without interference with an existing communication system by using a considerably low spectral power density such as the noise of an existing wireless system.

Meanwhile, according to the radar unit 110 using radio waves having such ultra-wideband frequencies, even when the dangerous space S is isolated from the outside, i.e., even when outer walls are present between the dangerous space S and the outside, radio waves may pass through the outer walls, and thus an effect arises in that a biometric signal of the subject P located in the dangerous space S may be detected from the outside.

Conventionally, the subject P located in the dangerous space S is detected using a monitoring camera in the dangerous space S. The monitoring camera is expensive. Furthermore, since the area which can be photographed by the monitoring camera is small, the subject P cannot be effectively detected when the conventional monitoring camera is used. Meanwhile, when a fire occurs inside the dangerous space S, a problem arises in that the monitoring camera cannot detect the presence and location of the subject P due to smoke.

However, the radar unit 110 of the system 100 for survival detection in a dangerous space according to the embodiment of the present invention may detect the subject P located in the dangerous space S from the outside, as described above, and thus the conventional problem may be effectively overcome.

The radar unit 110 includes a transmission unit 111, a reception unit 112, a computation unit 113, a communication unit 114, and a battery unit 115.

The transmission unit 111 transmits first radio waves to the subject P. In this case, the first radio waves are provided to have UWB frequencies. The transmission unit 111 is connected to and controlled by the computation unit 113 which will be described later. In this case, the first radio waves are used to compute a biometric signal by the computation unit 113.

In this case, the biometric signal refers to a heartbeat signal of the subject P, a respiration signal of the subject P, a temperature signal of the subject P, a blood flow signal of the subject P, or the like, and is generated by the computation unit 113 which will be described later.

The reception unit 112 receives second radio waves reflected after the above-described first radio waves have been transmitted to the subject P, and is electrically connected to and controlled by the computation unit 113. In this case, the second radio waves are used to compute a biometric signal by the computation unit 113.

The computation unit 113 generates the biometric signal of the subject P based on the first radio waves and the second radio waves, and is electrically connected to the transmission unit 111, the reception unit 112, and the communication unit 114.

The first radio waves generated by the transmission unit 111 are transferred to the subject P. In this case, a change occurs in the reflected second radio waves due to the movement of the chest attributable to the respiration and heartbeat of the subject P and the movement of the skin attributable to pulsation. In other words, when the second radio waves are radiated onto the subject, the Doppler effect occurs, and the computation unit 113 generates the biometric signal by analyzing a variation in the frequencies of the second radio waves generated by the above-described Doppler effect.

As described above, the computation unit 113 generates the biometric signal by using the Doppler effect. However, when biometric information is generated using the Doppler effect, an unexpected change occurs in the frequencies of the reflected second radio waves due to the displacement of the subject P, i.e., actions in which the subject P walks or actions in which the subject P stands up and sits down, and thus a problem may occur in that an error occurs in the biometric signal.

The radar unit 110 may include a light radiation unit (not shown). The light radiation unit (not shown) radiates light onto the subject P, detects reflected light, generates the displacement information of the subject P, and transfers the generated displacement information to the computation unit 113. In this case, the computation unit 113 compensates for the movement of the subject P by correcting the variation in the frequencies of the second radio waves generated by the displacement of the subject P, thereby generating more accurate biometric information.

The communication unit 114 transfers the biometric signal to the terminal unit 120. The communication unit 114 is electrically connected to the computation unit 113, and is wirelessly connected to the terminal unit 120 which will be described later.

The communication unit 114 may be provided using any one or more of a Bluetooth method, a wireless LAN (WLAN) method, a wideband code division multiple access (WCDMA) method, and a long term evolution (LTE) method, but is not necessarily limited thereto. The communication unit 114 may be provided using any method as long as the communication unit 114 is connected to the terminal unit 120 and can transfer the biometric signal to the terminal unit 120.

The battery unit 115 supplies power to the transmission unit 111, the reception unit 112, the computation unit 113, and the communication unit 114, and may be provided to be self-charged with power.

In other words, the battery unit 115 may be charged with power by absorbing surrounding electromagnetic waves, may be charged with power by absorbing light energy generated by the lamp unit 130 which will be described later, or may be charged with power by absorbing heat energy and light energy attributable to flames when a fire occurs.

Therefore, according to the radar unit 110 including the above-described transmission unit 111, reception unit 112, computation unit 113, communication unit 114, and battery unit 115, even when the dangerous space S is isolated from the outside, i.e., even when outer walls are present between the dangerous space S and the outside, radio waves may pass through the outer walls, and thus a biometric signal of the subject P located in the dangerous space S may be effectively detected from the outside.

Meanwhile, as shown in FIG. 4, the radar unit 110 may include a plurality of radar units 10, and the radar units 10 may be spaced apart from each other. It is preferable that the intervals at which the radar units 110 are spaced apart from each other be set within a detection area range within which the radar unit 110 can transmit first radio waves and receive second radio waves. According to the above-described radar units 110, the health state of the subject P may be effectively detected throughout the overall dangerous space S.

The terminal unit 120 displays the biometric signal, transferred from the radar unit 110, on a screen so that the holder of the terminal unit 120 becomes aware of the biometric information. The terminal unit 120 is disposed outside the dangerous space S.

The terminal unit 120 compares information about the previously input normal heart rate, respiration volume and blood flow rate of the subject P with the biometric signal, and generates an emergency signal when it is determined that the numerical values of the current heart rate, respiration volume, and blood flow rate of the subject P are out of the numerical ranges of the normal heart rate, respiration volume, and blood flow rate.

When it is determined that the state of the subject P is risky through the above-described comparison process, as described above, the terminal unit 120 generates an emergency signal, and transfers the emergency signal to the control unit 140 to be described later, thereby allowing the control unit 140 to dispatch emergency medical personnel E to the dangerous space S.

Meanwhile, the terminal unit transfers the emergency signal to the lamp unit 130. The lamp unit 130 having received the emergency signal is immediately lit. Through this process, the emergency medical personnel E dispatched to the dangerous space S may effectively find the subject P.

Although the terminal unit 120 may be provided as a mobile device such as a smartphone, a tablet, or the like, it is not limited thereto. The terminal unit 120 may be provided as any device as long as the device can receive a biometric signal from the communication unit 114, can display the biometric signal on a screen, and can transfer an emergency signal to the lamp unit 130 and the control unit 140.

A dedicated application is installed on the terminal unit 120 so that the biometric signal can be effectively displayed, and the terminal unit 120 displays the biometric signal on a screen through the running of the application.

The lamp unit 130 is lit when receiving the emergency signal, and is disposed inside the dangerous space S. It is preferable that the lamp unit 130 be disposed on the top of the dangerous space S, i.e., the ceiling of a structure which forms the dangerous space S.

Meanwhile, as shown in FIG. 4, the lamp unit 130 includes a plurality of lamp units 130, and the lamp units 130 may be disposed between the plurality of radar units 110. According to the above-described lamp units 130, the emergency medical personnel E dispatched to the dangerous space S may effectively find the subject P.

When receiving the emergency signal from the terminal unit 120, the control unit 140 dispatches the emergency medical personnel E to the dangerous space S. The control unit 140 is electrically connected to the above-described terminal unit 120.

By the control unit 140, the emergency medical personnel E may be effectively dispatched to the dangerous space S in the case where the health of the subject P located in the dangerous space S is risky.

In accordance with the system 100 for survival detection in a dangerous space, including the above-described radar unit 110, terminal unit 120, lamp unit 130, and control unit 140, according to the embodiment of the present invention, the survival and location of the subject P located in the dangerous space S may be effectively detected from the outside, and thus the emergency medical personnel E may be effectively dispatched to the dangerous space S where the subject P is located.

A method of detecting the survival of a subject by using a system for survival detection in a dangerous space according to one embodiment of the present invention will be described in detail below with reference to the accompanying drawings.

Figure 5:
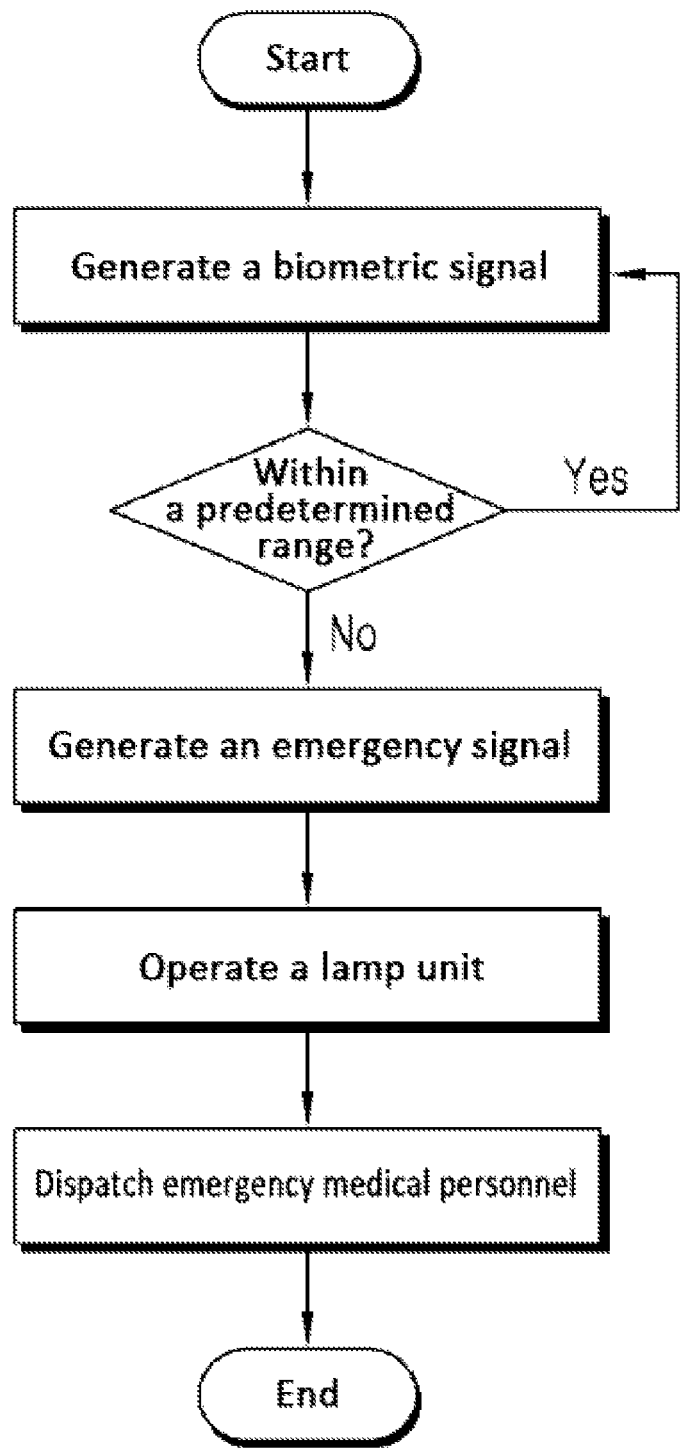
FIG. 5 is a flowchart of a method of detecting the survival of a subject by using a system for survival detection in a dangerous space according to the embodiment of the present invention.

FIG. 5 is a flowchart of the method of detecting the survival of a subject by using a system for survival detection in a dangerous space according to the embodiment of the present invention.

As shown in FIG. 5, a biometric signal of the subject P located in the dangerous space S is detected and generated by the radar unit 110. The generated biometric signal is transferred to the terminal unit 120. In this case, terminal unit 120 compares information about previously input normal heart rate, respiration volume and blood flow rate of the subject P with the biometric signal.

When in the above-described comparison process, it is determined that the numerical values of the current heart rate, respiration volume and blood flow rate of the subject P are out of the numerical value range of the normal heart rate, respiration volume, and blood flow rate, the terminal unit 120 generates an emergency signal.

The generated emergency signal is transferred to the lamp unit 130 and the control unit 140. By this, the lamp unit 130 is lit, and the emergency medical personnel E are dispatched to the dangerous space S by the control unit 140.

In accordance with the method of detecting the survival of a subject by using a system for survival detection in a dangerous space according to the embodiment of the present invention, which is based on the above-described process, the survival and location of the subject P located in the dangerous space S may be effectively detected from the outside, and thus the emergency medical personnel E may be effectively dispatched to the dangerous space S where the subject P is located.

The scope of the present invention is not limited to the above-described embodiments, but may be implemented as various types of embodiments within the scope of the attached claims. It is considered that various ranges within which any person having ordinary knowledge in the art to which the present invention pertains may make modifications without departing from the gist of the present invention fall within a range described in the claims of the present application.

The invention claimed is:

1. A system for survival detection in a dangerous space, the system comprising:
   a plurality of radar units which are disposed in a dangerous space which is a space where a subject is located, which are provided as radar using ultra-wideband (UWB) frequencies, and which detect a biometric signal of the subject;
   a terminal unit which is disposed outside the dangerous space, which displays the biometric signal, transferred from the radar unit, on a screen, and which generates an emergency signal when it is determined based on the biometric signal that the subject is in a risky state; and
   a lamp unit which is disposed in the dangerous space, and which is lit when receiving the emergency signal,
   wherein each of the radar units comprises:

a transmission unit which transmits first radio waves to the subject;

a reception unit which receives second radio waves reflected after the first radio waves have been transmitted to the subject;

a computation unit which generates the biometric signal of the subject based on the first radio waves and the second radio waves;

a communication unit which transfers the biometric signal to the terminal unit; and a battery unit which supplies power to the transmission unit, the reception unit, the computation unit, and the communication unit, wherein the battery unit is configured to be charged with the power by absorbing heat energy and light energy attributable to flames when a fire occurs in the dangerous space, and wherein the radar units are spaced apart from each other such that the each of the radar units is disposed within a detection area range within which the each of the radar units transmits the first radio waves and receives the second radio waves and thus the radar units detect a health state and a location of the subject throughout the dangerous space.

2. The system of claim 1, further comprising a control unit which dispatches emergency medical personnel to the dangerous space when receiving the emergency signal from the terminal unit.

3. The system of claim 1, wherein the communication unit is provided to be able to communicate with the terminal unit by using any one or more of a Bluetooth method, a wireless LAN (WLAN) method, a wideband code division multiple access (WCDMA) method, and a long term evolution (LTE) method.

* * * * *